United States Patent [19]
Sasaki et al.

[11] Patent Number: 5,258,476
[45] Date of Patent: Nov. 2, 1993

[54] PROCESS FOR PRODUCING ETHYLENE-α-OLEFIN COPOLYMERS

[75] Inventors: Toshio Sasaki; Hirofumi Johoji; Hiroyuki Shiraishi, all of Ichihara; Yoshihiro Miyoshi, Chiba, all of Japan

[73] Assignee: Sumitomo Chemical Company, Limited, Osaka, Japan

[21] Appl. No.: 850,314

[22] Filed: Mar. 12, 1992

[30] Foreign Application Priority Data

Mar. 15, 1991 [JP] Japan .................. 3-051128

[51] Int. Cl.$^5$ .............................. C08F 4/64
[52] U.S. Cl. ........................ 526/161; 526/348.2; 526/348.3; 526/348.4; 526/348.5; 502/103
[58] Field of Search ........................ 526/161

[56] References Cited

U.S. PATENT DOCUMENTS 4,892,914 1/1990 Hefner .................. 526/161
5,039,766 8/1991 Sasaki et al. .......... 526/161

FOREIGN PATENT DOCUMENTS 271874 6/1988 European Pat. Off. .
0320169 6/1989 European Pat. Off. .
0349886 1/1990 European Pat. Off. .

*Primary Examiner*—Joseph L. Schofer
*Assistant Examiner*—David Wu
*Attorney, Agent, or Firm*—Stevens, Davis, Miller & Mosher

[57] ABSTRACT

A process for producing an ethylene-α-olefin copolymer which comprises copolymerizing ethylene and an α-olefin at a temperature higher than 120° C. by using a catalyst system comprising a specified titanium amide compound represented by general formula $(R^1R^2N)_{4-n}TiY_n$ and an oxygen-containing alkylaluminum compound. According to the above process, there can be obtained ethylene-α-olefin copolymers narrow in composition distribution, high in molecular weight and excellent in weather resistance, colorizability, corrosion resistance and dynamic properties.

12 Claims, 2 Drawing Sheets

PROCESS FOR PRODUCING ETHYLENE-α-OLEFIN COPOLYMERS

BACKGROUND OF THE INVENTION

1. Field of the Invention

This invention relates to a process for producing ethylene-α-olefin copolymers using a novel Ziegler catalyst system. Particularly, this invention relates to a process for producing ethylene-α-olefin copolymers at a temperature higher than 120° by using a polymerization catalyst comprising a titanium amide compound and an oxygen-containing alkylaluminum compound. More particularly, this invention relates to a process for producing ethylene-α-olefin copolymers narrow in composition distribution, high in molecular weight and excellent in weather resistance, colorizability, corrosion resistance and dynamic properties by using a novel catalyst system.

2. Description of the Prior Art

Olefin copolymers are used in very many fields such as film, laminate, electric wire coating, injection molded products, special molded products, and the like. It is generally known in these fields that a product excellent in transparency, impact resistance and blocking resistance can be obtained by using a polymer narrow in molecular weight distribution or composition distribution. Particularly in the case of copolymers, the molecular weight distribution and composition distribution exercise an increasing influence upon the properties of olefin copolymer as the content of copolymerized olefin increases. Thus, an olefin copolymer narrow in molecular weight distribution and composition distribution is waited for.

As a process for producing olefin copolymers, the method of using the so-called Ziegler-Natta catalyst comprising a transition metal of Group IV to VI of the periodic table and an organometallic compound of a metal of Group I to III is generally widely known.

As the process for producing an olefin copolymer at high temperatures by using these Ziegler type catalyst, the following two processes are practiced today.

The first process is usually called "solution process" which comprises polymerizing or copolymerizing olefins in a solvent such as cyclohexane or the like. In this process, an olefin is polymerized at a temperature of 20° to 250° C. and a pressure of 5 to 50 kg/cm2 by the use of a Ziegler type catalyst to form a solution of polymer.

The second process is usually called "high pressure ion process" which comprises polymerizing or copolymerizing olefins in the absence of solvent at a high temperature and a high pressure to form a polymer in a molten state.

These high temperature solution polymerization process and high pressure ion polymerization process using a Ziegler catalyst are known to have a merit that the reactor is compact and comonomer can be selected with a high degree of freedom.

On Ziegler type solid catalyst for use at high temperature, a variety of improvements have been proposed up to date as described in, for example, Japanese Patent Application KOKAI (Laid-Open) Nos. 51-144397, 54-52192, 56-18607, 56-99209, 57-87405, 57-153007, 57-190009 and 58-208803. However, all these techniques give a polymer broad in composition distribution and are unsatisfactory in transparency and dynamic properties of the formed polymers.

On the other hand, as a method for obtaining an olefin polymer narrow in molecular weight distribution and composition distribution, a process for polymerizing an olefin by using a catalyst formed from a vanadium type catalyst component and an organoaluminum compound catalyst component is known. However, this process is disadvantageous in that activity per transition metal is low and the activity further decreases when polymerization is carried out at a high temperature of 120° C. or above.

In order to solve such a problem, processes using a catalyst system comprising a titanium compound or zirconium compound and an aluminum compound have been disclosed up to today, and recently, a process using a catalyst system comprising a titanium compound or zirconium compound and aluminoxane has been proposed [Japanese Patent Application KOHYO (International Laid-Open) No. 1-503788; Japanese Patent Application KOKAI (Laid-Open) No. 62-121708].

However, when such a catalyst system is used in the high temperature solution polymerization process, the formed copolymer is low in molecular weight and cannot be said to be satisfactory in practical properties. Further, such a catalyst system is not sufficient in the ability to copolymerize α-olefins. Thus, expensive α-olefin must be fed into the polymerization system in a large amount, which is undesirable in economical point of view.

As processes for homo- or co-polymerizing olefins by using a catalyst system comprising a compound having titanium-nitrogen bond and an organoaluminum compound, a process using a catalyst system comprising a solid component prepared by supporting a titanium amide compound on magnesium halide and an organoaluminum compound (EP-A-0 320169; Italian Patent No. 867243), a process using a catalyst system comprising a titanium diphenylamide compound and an organoaluminum compound [EP-A-0 104374; Japanese Patent Application KOKOKU (Examined Publication) No. 42-11646], a process using a catalyst system comprising an aryl substituent-containing titanium amide compound and an organoaluminum compound [Japanese Patent Application KOKOKU (Examined Publication) No. 42-22691], and a process using a catalyst system comprising a lower alkyl-containing titanium amide compound such as dimethylamidotitanium trichloride and the like and an organoaluminum compound [J. of Polym. Sci. Part A-1, 241, 6 (1968)]have been proposed.

However, if a copolymerization of ethylene and α-olefin is carried out with the catalyst systems disclosed in these papers, no satisfactory result has been obtained. Thus, according to the process disclosed in EP-A-0 320169 and Italian Patent No. 867243, the formed ethylene-α-olefin copolymer has a broad composition distribution. According to the processes disclosed in EP-A-0 104374, Japanese Patent Application KOKOKU (Examined Publication) Nos. 42-11646 and 42-22691 and J. Polym. Sci. Part A-1, 241, 6 (1968), catalyst activity, copolymerizability and narrowness of composition distribution are unsatisfactory.

In order to solve the above-mentioned problems, the present inventors previously proposed [Japanese Patent Application KOKAI (Laid-Open) No. 2-77412]a process for copolymerizing ethylene and α-olefin to give a copolymer having a narrow composition distribution which comprises using a catalyst system comprising an organoaluminum compound and a liquid catalyst component comprising a titanium compound represented by the following general formula:

$$(R^1R^2N)_{4-(m+n)}TiX_mY_n$$

wherein $R^1$ and $R^2$ each represent a saturated hydrocarbon group having 8 to 30 carbon atoms, X represents a halogen atom, Y represents an alkoxy group, m is a number satisfying $1 \leq m \leq 3$, and n is a number satisfying $0 \leq n \leq 2$, and $(m+n)$ satisfies $1 \leq (m+n) \leq 3$.

However, this process had a fault that, if the catalyst system was used at a high temperature, the catalyst activity was very low and the ability to copolymerize α-olefin was low, and the resulting polymer was unsatisfactory in composition distribution.

SUMMARY OF THE INVENTION

In view of the above-mentioned present status of things, the problem to be solved by this invention or the object of this invention consists in providing a process for producing an ethylene-α-olefin copolymer which comprises using a novel catalyst system, by the use of which a high catalyst activity per transition metal can be exhibited at high temperatures and an ethylene-α-olefin copolymer narrow in composition distribution, high in molecular weight and excellent in weather resistance, colorizability, corrosion resistance and dynamic properties can be obtained.

Thus, this invention relates to a process for producing an ethylene-α-olefin copolymer which comprises copolymerizing ethylene and an α-olefin at a polymerization temperature higher than 120° C. by using a catalyst system comprising as catalyst component (A) a titanium amide compound represented by the following general formula:

$$(R^1R^2N)_{4-n}TiY_n$$

wherein $R^1$ and $R^2$ each represent a hydrocarbon group having 1 to 30 carbon atoms, Y represents an alkoxy group and n represents a number satisfying $0 \leq n \leq 3$, and, as catalyst component (B) an oxygen-containing alkylaluminum compound.

DETAILED DESCRIPTION OF THE INVENTION

Figure 1:
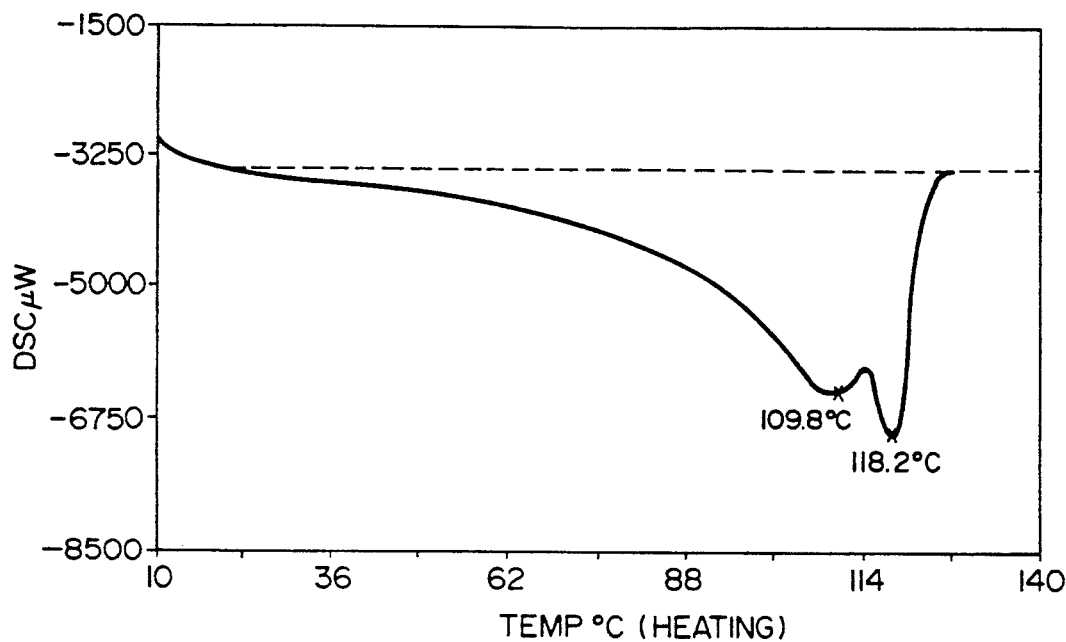
FIG. 1 is a differential scanning calorimeter (DSC) chart illustrating the melting behavior of the copolymer obtained in Example 1.

The catalyst component (A) used in this invention is constituted of a nitrogen-containing titanium compound represented by the following general formula:

$$(R^1R^2N)_{4-n}TiY_n$$

wherein $R^1$ and $R^2$, identical or different from each other, each represents a hydrocarbon group having 1 to 30 carbon atoms, Y represents an alkoxy group, and n represents a number satisfying $0 \leq n \leq 3$.

$R^1$ and $R^2$ are not critical, but preferably alkyl group and aryl group, and the catalyst component (A) may be in any of liquid and solid states.

As examples of the alkoxy group, methoxy, ethoxy, propoxy, butoxy, 2-ethylhexoxy, decoxy and the like can be referred to. From the viewpoint of catalyst performances, the alkoxy group is not critical. The alkoxy group preferably has 1 to 12 carbon atoms.

Concrete preferable examples of such titanium amide compound (A) include the followings:
tetrakis(dimethylamino)titanium,
tetrakis(diethylamino)titanium,
tetrakis(dipropylamino)titanium,
tetrakis(dibutylamino)titanium,
tetrakis(dihexylamino)titanium,
tetrakis(diphenylamino)titanium,
tetrakis(dioctylamino)titanium,
tetrakis(didecylamino)titanium,
tetrakis(dioctadecylamino)titanium,
methoxytris(dimethylamino)titanium,
ethoxytris(dimethylamino)titanium,
butoxytris(dimethylamino)titanium,
hexoxytris(dimethylamino)titanium,
2-ethylhexoxytris(dimethylamino)titanium,
decoxytris(dimathylamino)titanium,
methoxytris(diethylamino)titanium,
ethoxytris(diethylamino)titanium,
butoxytris(diethylamino)titanium,
hexoxytris(diethylamino)titanium,
2-ethylhexoxytris(diethylamino)titanium,
decoxytris(diethylamino)titanium,
methoxytris(dipropylamino)titanium,
ethoxytris(dipropylamino)titanium,
butoxytris(dipropylamino)titanium,
hexoxytris(dipropylamino)titanium,
2-ethylhexoxytris(dipropylamino)titanium,
decoxytris(dipropylamino)titanium,
methoxytris(dibutylamino)titanium,
ethoxytris(dibutylamino)titanium,
butoxytris(dibutylamino)titanium,
hexoxytris(dibutylamino)titanium,
2-ethylhexoxytris(dibutylamino)titanium,
decoxytris(dibutylamino)titanium,
methoxytris(dihexylamino)titanium,
ethoxytris(dihexylamino)titanium,
butoxytris(dihexylamino)titanium,
hexoxytris(dihexylamino)titanium,
2-ethylhexoxytris(dihexylamino)titanium,
decoxytris(dihexylamino)titanium,
methoxytris(diphenylamino)titanium,
ethoxytris(diphenylamino)titanium,
butoxytris(diphenylamino)titanium,
hexoxytris(diphenylamino)titanium,
2-ethylhexoxytris(diphenylamino)titanium,
decoxytris(diphenylamino)titanium,
methoxytris(dioctylamino)titanium,
ethoxytris(dioctylamino)titanium,
butoxytris(dioctylamino)titanium,
hexoxytris(dioctylamino)titanium,
2-ethylhexoxytris(didecylamino)titanium,
decoxytris(dioctylamino)titanium,
methoxytris(didecylamino)titanium,
ethoxytris(didecylamino)titanium,
butoxytris(didecylamino)titanium,
hexoxytris(didecylamino)titanium, 2-ethylhexoxytris(didecylamino)titanium,
decoxytris(didecylamino)titanium,
tris(dioctadecylamino)titanium,
ethoxytris(dioctadecylamino)titanium,
butoxytris(dioctadecylamino)titanium,
hexoxytris(dioctadecylamino)titanium,
2-ethylhexoxytris(dioctadecylamino)titanium,
decoxytris(dioctadecylamino)titanium, and the like.

Among these compounds, preferable are tetrakis(dimethylamino)titanium, tetrakis(diethylamino)titanium, tetrakis(dipropylamino)titanium, tetrakis(dibutylamino)titanium, tetrakis(dihexylamino)titanium, tetrakis(diphenylamino)titanium, tetrakis(dioctylamino)titanium, tetrakis(didecylamino)titanium, tetrakis(dioctadecylamino)titanium and the like.

As the method for synthesizing these titanium amide compounds (A), the methods mentioned in Japanese Patent Application KOKOKU (Examined Publication) Nos. 41-5397 and 42-11646, H. Burger et. al., J. of Organomet. hem., 108 (1976), 69–84, H. Burger et. al., J. of Organomet. Chem., 20 (1969), 129–139, etc. can be adopted.

In this invention, the synthesis was carried out according to these methods by reacting (i) a secondary amine compound represented by the following general formula:

$$R^4R^5NH$$

wherein $R^4$ and $R^5$ each represent a hydrocarbon group having 1 to 30 carbon atoms, with (ii) an alkyl-(alkali metal) represented by the following formula:

$$R^6M$$

wherein $R^6$ represents a hydrocarbon group having 1 to 30 carbon atoms and M represents an alkali metal such as Li, K and the like, to synthesize an alkali metal amide compound, and subsequently reacting said alkali metal amide compound with (iii) titanium tetrahalide represented by the following general formula:

$$TiX_4$$

wherein X represents a halogen atom such as chlorine, bromine, iodine and the like and preferably chlorine.

As examples of the oxygen-containing alkylaluminum compound used in this invention as catalyst component (B) of the polymerization catalyst system, cyclic and acyclic aluminoxanes of which structures are represented by the following general formulas:

$$[Al(R^3)-O]_k \text{ and } R^3_2Al[Al(R^3)-O]_k Al\cdot R^3_2$$

wherein $R^3$ represents a hydrocarbon group having 1 to 8 carbon atoms and k is an integer of 1 or greater, preferably 2 to 30, can be referred to. More specifically, concrete examples of said oxygen-containing alkylaluminum compound include tetramethyladialuminoxane, tetraethyldialuminoxane, tetrabutyldialuminoxane, tetrahexyldialuminoxane, methylaluminoxane, ethylaluminoxane, butylaluminoxane, hexylaluminoxane and the like, among which methylaluminoxane is particularly preferable.

The aluminoxanes are produced by various methods. Preferably, they are produced by contacting water with a solution of a trialkylaluminum such as trimethylaluminum in an appropriate organic solvent such as toluene or aliphatic hydrocarbon. For example, an alkylaluminum is treated with water in the form of wetting solvent. According to another preferable method, an alkylaluminum such as trimethylaluminum is contacted with a hydrated salt such as copper sulfate hydrate or ferrous sulfate hydrate. Production of aluminoxane in the presence of ferrous sulfate hydrate is most preferable. According to this method, a dilute solution of trimethylaluminum in, for example, toluene is treated with ferrous sulfate hydrate represented by $FeSO_4\cdot 7H_2O$. Preferably, 6 to 7 moles of trimethylaluminum is treated with about one mole of ferrous sulfate hydrate. Occurrence of the reaction can be proved by generation of methane gas.

The amount of component (B) can be varied in so wide a range as 1 to 10,000 moles, preferably 1 to 1,000 moles and more preferably 1 to 500 moles, per one mole of titanium atom in component (A).

In this invention, the method for feeding the catalyst components into polymerization reactor is not particularly critical, except that they have to be fed in an inert gas such as nitrogen, argon and the like in a moisture-free state.

The catalyst components (A) and (B) may be fed either separately or after mutually contacting them previously.

In this invention, the conditions of polymerization are as follows. Thus, the polymerization temperature is 120° C. or above, preferably 135° C. to 350° C., and more preferably 150° C. to 270° C. As for the polymerization pressure, it is 5 to 100 kg/cm² and preferably 10 to 50 kg/cm² in the case of solution process; and 350 to 3,500 kg/cm² and preferably 700 to 1,800 kg/cm² in the case of high pressure ion process. As for the mode of polymerization, batch-wise process and continuous process are both adoptable.

In the solution process polymerization using a catalyst system of this invention, the solvent is usually selected from hydrocarbon solvents such as hexane, cyclohexane, heptane, kerosine fractions, toluene and the like.

The α-olefins usable in this invention are those having 3 to 20 carbon atoms, preferably 3 to 10 carbon atoms, such as propylene, butene-1, 4-methylpentene-1, hexene-1, octene-1, vinylcyclohexane and the like.

This invention is particularly successfully applicable to production of ethylene-α-olefin copolymers constituted of at least 80% by mole of ethylene and a residual quantity of at least one α-olefin, particularly those such as propylene, butene-1, 4-methylpentene-1, hexene-1, octene-1 and the like.

It is also possible to add a chain transfer agent such as hydrogen and the like in order to regulate the molecular weight of polymer.

Next, this invention will be illustrated in more detail by way of the following examples and comparative examples.

Properties of polymers referred to in the examples were measured according to the following methods.

Thus, α-olefin content was determined from the characteristic absorptions of ethylene and α-olefin by the use of infrared spectrophotometer JASCO-302 manufactured by NIPPON BUNKO KOGYO CO.

Intrinsic viscosity [0] was measured with Ubbellohde viscometer in tetralin solution at 135° C.

As the measure for expressing composition distribution, average melting point <Tm> was used, which was determined from a measurement using a differential scanning calorimeter (DSC) and a calculation according to the following equation. A smaller value of $<Tm>$ means a narrower composition distribution.

$$<Tm> = \frac{\Sigma (Hi \times ti)}{\Sigma Hi}$$

wherein 50° C.<ti<130° C., and Hi is energy of melting (W/g) at temperature Ti.

EXAMPLE 1

(1) SYNTHESES OF CATALYST COMPONENTS

SYNTHESIS OF TITANIUM AMIDE COMPOUND (A)

After replacing the inner atmosphere of a 300 ml flask equipped with a stirrer, a dropping funnel and a thermometer with argon gas, 18.1 ml (60 mmoles) of dioctylamine and 150 ml of hexane were charged into the flask.

Then, 60 mmoles of butyllithium diluted with 38.7 ml of hexane was dropwise added from the dropping funnel into the flask over a period of 30 minutes while keeping the temperature of the solution in the flask at 5° C. After dropping it, the resulting mixture was reacted first at 5° C. for 2 hours and thereafter at 30° C. for 2 hours.

Then, 1.65 ml (15 mmoles) of titanium tetrachloride was dropwise added from the dropping funnel into the reacted mixture over a period of 30 minutes while keeping the temperature at 5° C. After dropping it, the resulting mixture was further reacted first at 5° C. for one hour and thereafter at 30° C. for 2 hours to obtain 15 mmoles (yield of this reaction was assumed to be 100%) of titanium amide compound (A) represented by a composition formula $[(C_8H_{17})_2N]_4Ti$ (catalyst concentration: 0.062 mmole Ti/ml).

(2) POLYMERIZATION OF ETHYLENE

After vacuum-drying an autoclave having an inner volume of 400 ml and equipped with a stirrer and replacing its inner atmosphere with argon gas, 140 ml of toluene as a solvent and 480 mmoles of 1-hexene as an α-olefin were charged, and temperature of the reactor was elevated to 180° C. Then, ethylene was fed at a controlled ethylene pressure of 25 kg/cm$^2$ After the system had been stabilized, 8 mmoles of methylaluminoxane (MAO) manufactured by TOSOH-AKZO Co. as an organoaluminum compound was fed, and subsequently 0.08 mmole of the compound represented by the composition formula $[(C_8H_{17})_2N]_4Ti$ synthesized in Paragraph (1) was fed as a catalyst component. Then, a polymerization reaction was carried out for 2 minutes at a controlled temperature of 180° C. As a result, 22,000 g of a copolymer was obtained per 1 mole of transition metal (catalyst activity: 22,000 g-copolymer/mole-M). The results are shown in Table 1. FIG. 1 illustrates the melting behavior of the copolymer obtained herein measured by DSC. In FIG. 1, abscissa expresses temperature (° C.) and ordinate expresses energy of melting (μw). It can be said that when the melting peak of FIG. 1 appears at a lower temperature position, the composition distribution of polymer is narrower. In the case of the copolymer obtained herein, the composition distribution was very narrow.

COMPARATIVE EXAMPLE 1

A polymerization of ethylene was carried out in the same manner as in Example 1-(2), except that 8 mmoles of triisobutylaluminum (TIBA) was used as an organoaluminum compound in place of MAO. As a result, polymer was hardly obtained.

COMPARATIVE EXAMPLE 2

A polymerization of ethylene was carried out in the same manner as in Example 1-(2), except that 8 mmoles of ethylaluminum dichloride (EADC) was used as an organoaluminum compound in place of the MAO. As a result, 31,000 g of a polymer was obtained per 1 mole of transition metal. However, molecular weight of the polymer expressed in terms of [0] was 0.04 which was much lower than that in Example 1.

COMPARATIVE EXAMPLE 3

POLYMERIZATION OF ETHYLENE

After vacuum-drying an autoclave having an inner volume of 400 ml and equipped with a stirrer and replacing its inner atmosphere with argon gas, 140 ml of toluene as a solvent and 480 mmoles of 1-hexene as an α-olefin were charged, and temperature of the reactor was elevated to 80° C. Then, ethylene was fed at a controlled ethylene pressure of 6.0 kg/cm$^2$ After the system had been stabilized, 8 mmoles of MAO was charged as an organo-aluminum compound, and subsequently 0.08 mmole of the compound represented by the composition formula $[(C_8H_{17})_2N]_4Ti$ synthesized in Example 1-(1) was added as a catalyst component. Then, a polymerization reaction was carried out for 2 minutes at a controlled temperature of 80° C. As a result, polymer was hardly obtained.

EXAMPLE 2

A polymerization of ethylene was carried out in the same manner as in Example 1-(2), except that a polymerization temperature of 200° C. was adopted. As a result, a polymer having a narrow composition distribution was obtained as in Example 1.

COMPARATIVE EXAMPLE 4

A polymerization of ethylene was carried out in the same manner as in Example 2, except that 0.08 mmole of biscyclopentadienyl zirconium dichloride $(C_2ZrCl_2)$ was used as a catalyst component in place of the titanium amide compound (A) used in Example 2. As a result, molecular weight of the polymer expressed in terms of [η] was 0.17 which was much lower than that in Example 2.

COMPARATIVE EXAMPLE 5

(1) SYNTHESIS OF CATALYST COMPONENT

SYNTHESIS OF TITANIUM AMIDE COMPOUND

After replacing the inner atmosphere of a 100 ml flask equipped with a stirrer, a dropping funnel and a thermometer with argon gas, 6.0 ml (20 mmoles) of dioctylamine and 50 ml of hexane were charged.

Then, 20 mmoles of butyllithium diluted with 12.9 ml of hexane was dropwise added from the dropping funnel into the flask over a period of 30 minutes, while keeping the inner temperature of the flask at 5° C. After dropping it, the resulting mixture was reacted first at 5° C. for 2 hours and thereafter at 30° C. for 2 hours.

Then, 2.2 ml (20 mmoles) of titanium tetrachloride was dropwise added from the dropping funnel into the reacted mixture obtained above over a period of 30 minutes, while keeping the temperature of the mixture at 5° C. After dropping it, the resulting mixture was reacted first at 5° C. for one hour and thereafter at 30° C. for 2 hours, to obtain 20 mmoles (yield of this reaction was assumed to be 100%) of a titanium amide compound represented by a composition formula $(C_8H_{17})_2NTiCl_3$.

(2) POLYMERIZATION OF ETHYLENE

A polymerization was carried out in the same manner as in Example 1-(2), except that 0.08 mmole of the compound represented by the composition formula $(C_8H_{17})_2NTiCl_3$ synthesized in Paragraph (1) was used as a catalyst component in place of the compound represented by the composition formula $[(C_8H_{17})_2N]_4Ti$. The results are shown in Table 1. The polymer obtained herein had a broad composition distribution.

COMPARATIVE EXAMPLE 6

A polymerization of ethylene was carried out in the same manner as in Comparative Example 5-(2), except that 8 mmoles of TIBA was used as an organoaluminum compound in place of MAO. Results of the polymerization are shown in Table 1. Polymerization activity of the catalyst was very low, and the polymer obtained had a broad composition distribution.

COMPARATIVE EXAMPLE 7

Figure 2:
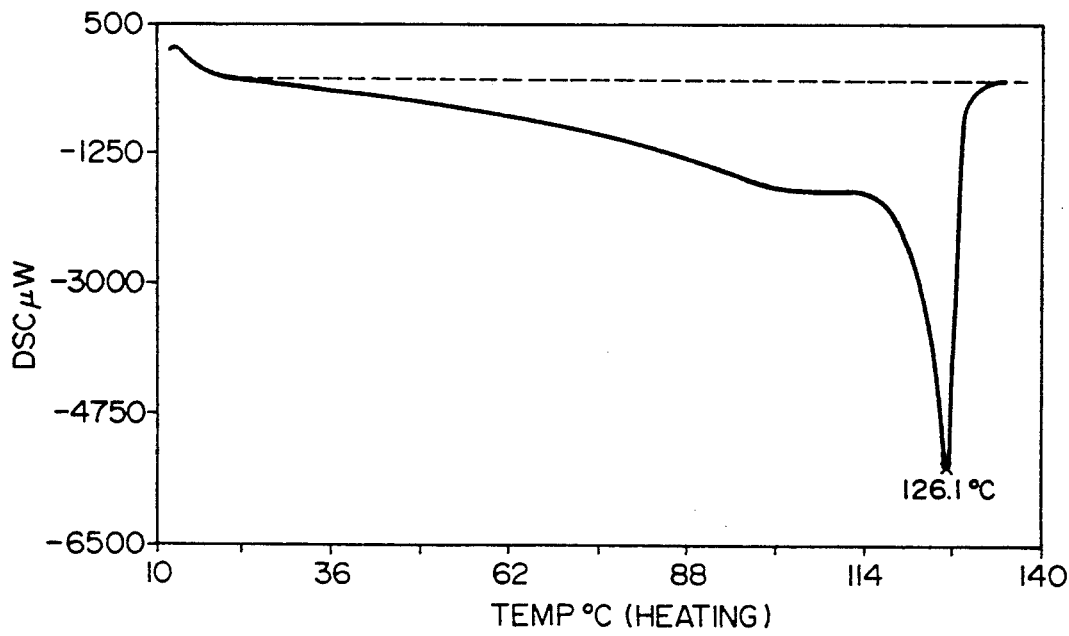
FIG. 2 is a DSC chart illustrating the melting behavior of the copolymer obtained in Comparative Example 7.

A polymerization of ethylene was carried out in the same manner as in Example 1-(2), except that 0.08 mmole of titanium tetrachloride was used as a catalyst component in place of the compound represented by the polymerization are shown in Table 1, and the DSC chart of the polymer is shown in FIG. 2. It is apparent therefrom that the catalyst used herein was low in copolymerizing ability and the polymer obtained herein had a broad composition distribution.

COMPARATIVE EXAMPLE 8

(1) SYNTHESIS OF CATALYST COMPONENT

After replacing the inner atmosphere of a 100 ml flask equipped with a stirrer, a dropping funnel and a thermometer with argon gas, 3.8 ml (20 mmoles) of decyl alcohol and 50 ml of hexane were charged.

Then, 20 mmoles of butyllithium diluted with 12.9 ml of hexane was dropwise added from the dropping funnel into the flask over a period of 30 minutes, while keeping the inner temperature of the flask at 5° C. After dropping it, the resulting mixture was reacted first at 5° C. for 2 hours and thereafter at 30° C. for 2 hours.

Then, 0.55 ml (5 mmoles) of titanium tetrachloride was dropwise added from the dropping funnel into the reacted mixture over a period of 30 minutes, while keeping the inner temperature at 5° C. After dropping it, the resulting mixture was reacted first at 5° C. After dropping it, the resulting mixture was reacted first at 5° C. for one hour and thereafter at 30° C. for 2 hours to obtain 5 mmoles (yield of this reaction was assumed to be 100%) of a titanium compound represented by a composition formula $(C_{10}H_{21}O)_4Ti$.

(2) POLYMERIZATION OF ETHYLENE

Figure 3:
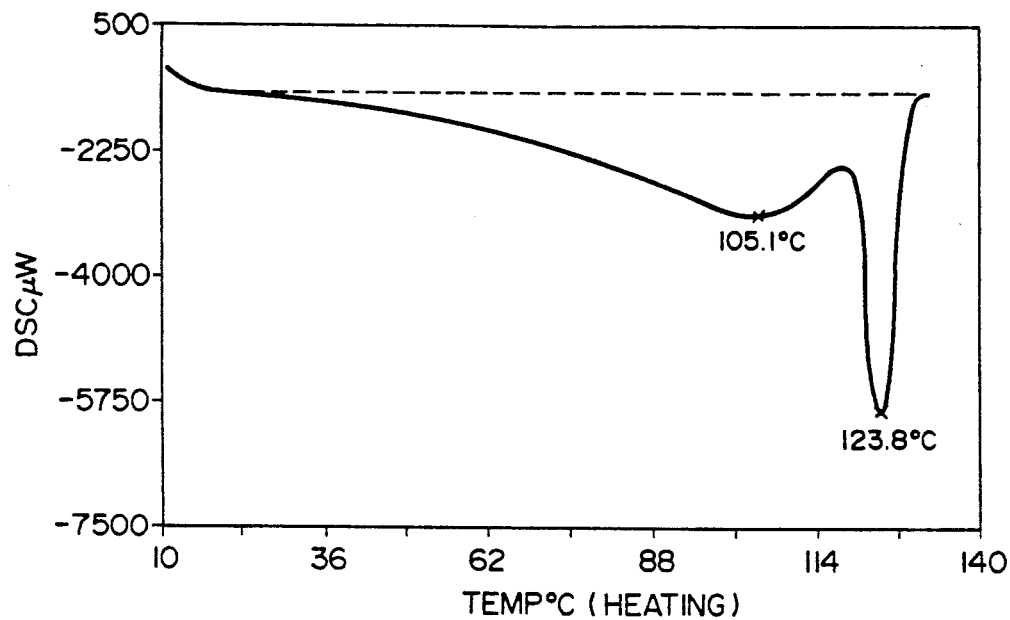
FIG. 3 is a DSC chart illustrating the melting behavior of the copolymer obtained in Comparative Example 8.
Figure 4:
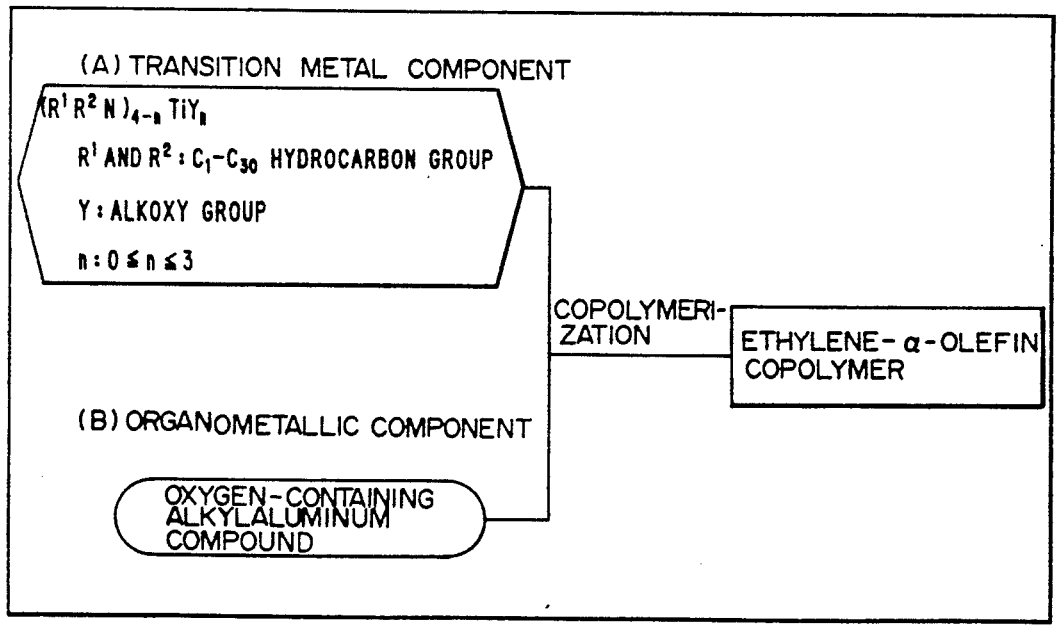
FIG. 4 is a flow chart diagram for facilitating understanding of this invention. This flow chart diagram is nothing more than one typical example of the embodiments of this invention, and this invention is by no means limited by it.

A polymerization was carried out in the same manner as in Example 1-(2), except that the compound represented by the composition formula $(C_{10}H_{21}O)_4Ti$ synthesized in Paragraph (1) was used as a catalyst component in place of the compound represented by the composition formula $[(C_8H_{17})_2N]_4Ti$. The results of the polymerization are shown in Table 1, and DSC chart of the polymer thus obtained in shown in FIG. 3. It is apparent therefrom that the catalyst activity per transition metal was lower than that of Example 1 and the polymer obtained herein had a broad composition distribution.

EXAMPLE 3

(1) SYNTHESIS OF CATALYST COMPONENT

SYNTHESIS OF TITANIUM AMIDE COMPOUND (A)

After replacing the inner atmosphere of a 300 ml flask equipped with a stirrer, a dropping funnel and a thermometer with argon gas, 6.3 ml (60 mmoles) of diethylamine and 150 ml of hexane were charged.

Then, 60 mmoles of butyllithium diluted with 38.7 ml of hexane was dropwise added from the dropping funnel into the flask over a period of 30 minutes, while keeping the temperature of the solution in the flask at 5° C. After dropping it, the resulting mixture was reacted first at 5° C. for 2 hours and thereafter at 30° C. for 2 hours.

The, 1.65 ml (15 mmoles) of titanium tetrachloride was dropwise added from the dropping funnel into the reacted mixture over a period of 30 minutes, while keeping the temperature of the mixture at 5° C. After dropping it, the resulting mixture was reacted first at 5° C. for one hour and thereafter at 30° C. for 2 hours to obtain 15 mmoles (yield of this reaction was assumed to be 100%) of a titanium amide compound (A) represented by a composition formula $[(C_2H_5)_2N]_4Ti$.

(2) POLYMERIZATION OF ETHYLENE

A polymerization was carried out in the same manner as in Example 1-(2), except that 0.08 mmoles of the compound represented by the composition formula $[(C_2H_5)_2N]_4Ti$ synthesized in Paragraph (1) was used as a catalyst component in place of the compound represented by the composition formula $[(C_8H_{17})_2N]_4Ti$. Thus, a polymer having a narrow composition distribution was obtained as in Example 1.

COMPARATIVE EXAMPLE 9

A polymerization of ethylene was carried out in the same manner as in Example 3-(2), except that 8 mmoles of TIBA was used as an organoaluminum compound in place of MAO. As a result, polymer was hardly obtained.

COMPARATIVE EXAMPLE 10

(1) SYNTHESIS OF CATALYST COMPONENT

SYNTHESIS OF TITANIUM AMIDE COMPOUND

After replacing the inner atmosphere of a 100 ml flask equipped with a stirrer, a dropping funnel and a thermometer with argon gas, 2.1 ml (20 mmoles) of diethylamine and 50 ml of hexane were charged.

The, 20 mmoles of butyllithium diluted with 12.9 of hexane was dropwise added from the dropping funnel into the flask over a period of 30 minutes, while keeping the inner temperature of the flask at 5° C. After dropping it, the resulting mixture was reacted first at 5° C. for 2 hour and thereafter at 30° C. for 2 hours.

The, 2.2 ml (20 mmoles) of titanium tetrachloride was dropwise added from the dropping funnel into the reacted mixture over a period of 30 minutes, while keeping the inner temperature of the flask at 5° C. After dropping it, the resulting mixture was reacted first at 5° C. for one hour and thereafter at 30° C. for 2 hour.

After the reaction, the mixture was allowed to stand to separate the solid from the liquid. The separated solid was twice washed with each 50 ml portion of hexane and dried under reduced pressure to obtain 4.5 g of a solid titanium amide compound represented by a composition formula $(C_2H_5)_2NTiCl_3$.

(2) POLYMERIZATION OF ETHYLENE

A polymerization was carried out in the same manner as in Example 1 (2), except that 0.08 mmole of the compound represented by the composition formula $(C_2H_5)_2NTiCl_3$ was used as the catalyst component in place of the $[(C_8H_{17})_2N]_4Ti$. The polymer thus obtained had a broad composition distribution.

COMPARATIVE EXAMPLE 11

A polymerization of ethylene was carried out in the same manner as in Comparative Example 10-(2), except that 8 mmoles of TIBA was used as an organoaluminum compound in place of MAO. The result of the polymerization are shown in Table 1. It is apparent that the catalyst used herein had a very low polymerization activity, and the polymer obtained herein had a broad composition distribution.

COMPARATIVE EXAMPLE 12

(1) SYNTHESIS OF CATALYST COMPONENT

SYNTHESIS OF TITANIUM AMIDE COMPOUND

After replacing the inner atmosphere of a 200 ml flask equipped with a stirrer, a dropping funnel and a thermometer with argon gas, 2.7 g (16 mmoles) of diphenylamine and 100 ml of hexane were charged.

Then, 16 mmoles of butyllithium diluted with 10.3 ml of hexane was dropwise added from the dropping funnel into the flask over a period of 30 minutes, while keeping the inner temperature of the flask at 5° C. After dropping it, the resulting mixture was reacted first at 5° C. for 2 hours and thereafter at 30° C. for 2 hours.

Then, 1.76 ml (16 mmoles) of titanium tetrachloride was dropwise added from the dropping funnel into the reacted mixture obtained above over a period of 30 minutes, while keeping the temperature of the mixture at 5° C. After dropping it, the resulting mixture was reacted first at 5° C. for one hour and thereafter at 30° C. for 2 hours, to obtain 16 mmoles (yield of this reaction was assumed to be 100%) of a titanium amide compound represented by a composition formula $(C_6H_5)_2NTiCl_3$.

(2) POLYMERIZATION OF ETHYLENE

A polymerization was carried out in the same manner as in Example 1-(2), except that 0.08 mmole of the compound represented by the composition formula $(C_6H_5)_2NTiCl_3$ synthesized in Paragraph (1) was used in place of the compound represented by the composition formula $[(C_8H_{17})_2N]_4Ti$ and 8 mmoles of triethylaluminum (TEA) was used as an organoaluminum compound in place of MAO. The results are shown in Table 1. The catalyst used herein had a very low polymerization activity and the polymer obtained herein had a broad composition distribution.

EXAMPLE 4

(1) SYNTHESIS OF CATALYST COMPONENT

SYNTHESIS OF TITANIUM AMIDE COMPOUND (A)

After replacing the inner atmosphere of a 300 ml flask equipped with a stirrer, a dropping funnel and a thermometer with argon gas, 2.7 g (16 mmoles) of diphenylamine and 200 ml of hexane were charged.

Then, 16 mmoles of butyllithium diluted with 10.3 ml of hexane was dropwise added from the dropping funnel into the flask over a period of 30 minutes, while keeping the inner temperature of the flask at 5° C. After dropping it, the resulting mixture was reacted first at 5° C. for 2 hours and thereafter at 30° C. for 2 hours.

Then, 0.44 ml (4 mmoles) of titanium tetrachloride was dropwise added from the dropping funnel into the reacted mixture obtained above over a period of 30 minutes, while keeping the temperature of the mixture at 5° C. After dropping it, the resulting mixture was reacted first at 5° C. for one hour and thereafter at 30° C. for 2 hours, to obtain 4 mmoles (yield of this reaction was assumed to be 100%) of a solid titanium amide compound (A) represented by a composition formula $[(C_6H_5)_2N]_4Ti$.

(2) POLYMERIZATION OF ETHYLENE

A polymerization was carried out in the same manner as in Example 1-(2), except that 0.08 mmole of the compound represented by the composition formula $[(C_6H_5)_2N]_4Ti$ synthesized in Paragraph (1) was used as a catalyst component in place of the compound represented by the composition formula $[(C_8H_{17})_2N]_4Ti$. The polymer obtained herein had a narrow composition distribution as in Example 1.

COMPARATIVE EXAMPLE 13

A polymerization of ethylene was carried out in the same manner as in Example 4 (2), except that 8 mmoles of diethylaluminum chloride (DEAC) was used as an organoaluminum compound in place of MAO. The results of the polymerization are shown in Table 1. The catalyst used herein was much lower than the catalyst used in Example 4 in polymerization activity, and the polymer obtained herein had a broad composition distribution.

EXAMPLE 5

(1) SYNTHESIS OF CATALYST COMPONENT

SYNTHESIS OF TITANIUM AMIDE COMPOUND (A)

After replacing the inner atmosphere of a 300 ml flask equipped with a stirrer, a dropping funnel and a thermometer with argon gas, 10.5 ml (60 mmoles) of diisobutylamine and 150 ml of hexane were charged.

Then, 60 mmoles of butyllithium diluted with 38.7 ml of hexane was dropwise added from the dropping funnel into the flask over a period of 30 minutes, while keeping the inner temperature of the flask at 5° C. After dropping it, the resulting mixture was reacted first at 5° C. for 2 hours and thereafter at 30° C. for 2 hours.

Then, 1.65 ml (15 mmoles) of titanium tetrachloride was dropwise added from the dropping funnel into the reacted mixture obtained above over a period of 30 minutes, while keeping the temperature of the mixture at 5° C. After dropping it, the resulting mixture was reacted first at 5° C. for one hour and thereafter at 30° C. for 2 hours, to obtain 15 mmoles (yield of this reaction was assumed to be 100%) of solid titanium amide compound (A) represented by a composition formula $\{[(CH_3)_2CHCH_2]_2N\}_4Ti$.

(2) POLYMERIZATION OF ETHYLENE

A polymerization was carried out in the same manner as in Example 1 (2), except that 0.08 mmole of the compound represented by the composition formula $\{[(CH_3)_2CHCH_2]_2N\}_4Ti$ synthesized in Paragraph (1) was used was a catalyst component in place of the compound represented by the composition formula $[(C_8H_{17})_2N]_4Ti$. The polymer obtained herein had a narrow composition distribution as in Example 1.

COMPARATIVE EXAMPLE 14

(1) SYNTHESIS OF CATALYST COMPONENT

SYNTHESIS OF TITANIUM AMIDE COMPOUND

After replacing the inner atmosphere of a 300 ml flask equipped with a stirrer, a dropping funnel and a thermometer with argon gas, 0.41 ml (10 mmoles) of methyl alcohol and 25 ml of hexane were charged.

Then, 10 mmoles of butyllithium diluted with 6.5 ml of hexane was dropwise added from the dropping funnel into the flask over a period of 30 minutes, while keeping the inner temperature of the flask at 5° C. After dropping it, the resulting mixture was reacted first at 5° C. for 2 hours and thereafter at 30° C. for 2 hours.

Then, 10 mmoles of the compound represented by the composition formula $(C_8H_{17})_2NTiCl_3$ synthesized by the same method as in Comparative Example 5-(1) was dropwise added from the dropping funnel into the reacted mixture obtained above over a period of 30 minutes, while keeping the temperature of the mixture at 5° C. After dropping it, the resulting mixture was reacted first at 5° C. for one hour and thereafter at 30° C. for 2 hours, to obtain 10 mmoles (yield of this reaction was assumed to be 100%) of titanium amide compound represented by a composition formula $(C_8H_{17})_2NTi(OCH_3)Cl_2$.

(2) POLYMERIZATION OF ETHYLENE

A polymerization was carried out in the same manner as in Example 1-(2), except that 0.08 mmole of the compound represented by the composition formula $(C_8H_{17})_2NTi(OCH_3)Cl_2$ synthesized in Paragraph (1) was used as a catalyst component in place of the compound represented by the composition formula $[(C_8H_{17})_2N]_4Ti$. The polymer obtained herein had a broad composition distribution.

EXAMPLE 6

A copolymerization of ethylene and 1-butene was carried out in the same manner as in Example 1 by using the same catalyst system as used in Example 1. A polymer narrow in composition distribution was obtained as in Example 1.

EXAMPLE 7

A copolymerization of ethylene and 4-methylpentene-1 was carried out in the same manner as in Example 1 by using the same catalyst system as used in Example 1. A polymer narrow in composition distribution was obtained as in Example 1.

EXAMPLE 8

A copolymerization of ethylene and 1-decene was carried out in the same manner as in Example 1 by using the same catalyst system as used in Example 1. A polymer narrow in composition distribution was obtained as in Example 1.

The conditions and results of polymerization in all the examples mentioned above are summarized in Table 1.

TABLE 1

| | Catalyst system Titanium amide compound/ Organoaluminum compound | Activity (g-copolymer/ mole-M) | Comonomer content (% by wt.) | $[\eta]$ | $<Tm>$ (°C.) |
|---|---|---|---|---|---|
| Example-1 | $[(C_8H_{17})_2N]_4Ti$/MAO | 22,000 | 13.2 | 0.53 | 98.5 |
| Comp. Ex.-1 | $[(C_8H_{17})_2N]_4Ti$/TIBA | — | — | — | — |
| Comp. Ex.-2 | $[(C_8H_{17})_2N]_4Ti$/EADC | 31,000 | — | 0.04 | — |
| Comp. Ex.-3 | $[(C_8H_{17})_2N]_4Ti$/MAO | 500 | — | — | — |
| Example-2 | $[(C_8H_{17})_2N]_4Ti$/MAO | 19,000 | 12.3 | 0.50 | 99.8 |
| Comp. Ex.-4 | $Cp_2ZrCl_2$/MAO | 19,000 | 7.4 | 0.17 | — |
| Comp. Ex.-5 | $(C_8H_{17})_2NTiCl_3$/MAO | 8,000 | 13.1 | 0.77 | 101.0 |
| Comp. Ex.-6 | $(C_8H_{17})_2NTiCl_3$/TIBA | 800 | — | 0.40 | 105.7 |
| Comp. Ex.-7 | $TiCl_4$/MAO | 12,000 | 9.3 | 0.77 | 104.5 |
| Comp. Ex.-8 | $(C_{10}H_{21}O)_4Ti$/MAO | 5,200 | 13.9 | 0.73 | 102.3 |
| Example-3 | $[(C_2H_5)_2N]_4Ti$/MAO | 26,000 | 15.2 | 0.50 | 97.6 |
| Comp. Ex.-9 | $[(C_2H_5)_2N]_4Ti$/TIBA | — | — | — | — |
| Comp. Ex.-10 | $(C_2H_5)_2NTiCl_3$/MAO | 6,000 | 15.4 | 1.00 | 101.3 |
| Comp. Ex.-11 | $(C_2H_5)_2NTiCl_3$/TIBA | 800 | 9.7 | 0.99 | 105.1 |
| Comp. Ex.-12 | $(C_2H_5)_2NTiCl_3$/TEA | 500 | 9.5 | 2.07 | — |
| Example-4 | $[(C_6H_5)_2N]_4Ti$/MAO | 10,000 | 15.3 | 060 | 92.8 |
| Comp. Ex.-13 | $[(C_6H_5)_2N]_4Ti$/DEAC | 3,000 | 9.0 | 3.15 | 107.6 |
| Example-5 | $\{[(CH_3)_2CHCH_2]_2N\}_4Ti$/MAO | 38,000 | 12.8 | 0.55 | 96.3 |
| Comp. Ex.-14 | $(C_8H_{17})_2NTi(OCH_3)Cl_2$/MAO | 6,000 | 12.1 | 0.73 | 103.0 |
| Example-6 | $[(C_8H_{17})_2N]_4Ti$/MAO | 20,000 | 8.41 | 0.60 | 105.4 |
| Example-7 | $[(C_8H_{17})_2N]_4Ti$/MAO | 22,000 | 8.34 | 0.56 | 104.2 |
| Example-8 | $[(C_8H_{17})_2N]_4Ti$/MAO | 24,000 | 21.0 | 0.42 | 94.9 |

Comp. Ex.: Comparative Example,
Polymerization temperature: 180° C., except for 80° C. in Comp. Ex.-3 and 200° C. in Example-2 and Comp. Ex.-4.
MAO: Methylaluminoxane,
TIBA: Triisobutylaluminum,
EADC: Ethylaluminum dichloride,
TEA: Triethylaluminum,
DEAC: Diethylaluminum chloride

What is claimed is:

1. A process for producing an ethylene-α-olefine copolymer made up of at least 80% by mole of ethylene which comprises copolymerizing ethylene and an α-olefin at a polymerization temperature greater than 120° C. by using a catalyst system comprising (A) a titanium amide compound represented by the following general formula:

$$(R^1R^2N)_{4-n}TiY_n$$

wherein $R^1$ and $R^2$ each represent a hydrocarbon group having 1 to 30 carbon atoms, Y represents an alkoxy group and n represents a number satisfying $0 \leq n \leq 3$, and (B) an oxygen-containing alkylaluminum compound.

2. A process according to claim 1, wherein the titanium amide compound (A) is tetrakis(dimethylamino)titanium, tetrakis(diethylamino)titanium, tetrakis(dipropylamino)titanium, tetrakis(dibutylamino)titanium, tetrakis(dihexylamino)titanium, tetrakis(diphenylamino)titanium, tetrakis(dioctylamino)titanium, tetrakis(didecylamino)titanium or tetrakis(dioctadecylamino)titanium.

3. A process according to claim 1, wherein said oxygen-containing alkylaluminum compound (B) is at least one member selected from the group consisting of cyclic and acyclic aluminoxanes of which structures are represented by the following general formulas:

$$[Al(R^3)-O]_k \text{ and}$$

$$R^3{}_2Al]Al(R^3)-O]_kAlR^3{}_2$$

wherein $R^3$ represents a hydrocarbon group having 1 to 8 carbon atoms, and k represents an integer of 1 or greater.

4. A process according to claim 3, wherein the cyclic and acyclic aluminoxanes are tetramethyldialuminoxane, tetraethyldialuminoxane, tetrabutyldialuminoxane, tetrahexyldialuminoxane, methylaluminoxane, ethylaluminoxane, butylaluminoxane or hexylalumioxane.

5. A process according to claim 1, wherein the polymerization temperature is higher than 150° C.

6. A process according to claim 1, wherein the amount of the compound (B) is 1 to 10,000 moles per one mole of titanium atom in the compound (A).

7. A process according to claim 1, wherein the polymerization is carried out in a solution process using a hydrocarbon solvent or a high pressure ion process.

8. A process according to claim 7, wherein the polymerization pressure is 5 to 100 kg/cm² in the case of solution process.

9. A process according to claim 7, wherein the polymerization pressure is 350 to 3,500 kg/cm² in the case of high pressure ion process.

10. A process according to claim 1, wherein the olefin is those having 3 to 20 carbon atoms.

11. A process according to claim 10, wherein α-olefin is propylene, butene-1, 4-methylpentene-1, hexene 1, octene-1, or vinylcyclohexane.

12. A process according to claim 7, wherein in the solution process, hexane, heptane, kerosin fraction or toluene is used as solvent.

* * * * *